United States Patent [19]

Ehrat

[11] 4,303,832

[45] Dec. 1, 1981

[54] PROCESS FOR ASSESSING THE QUALITY OF A PRINTED PRODUCT

[75] Inventor: Kurt Ehrat, Steinmaur, Switzerland

[73] Assignee: Gretag Aktiengesellschaft, Regensdorf, Switzerland

[21] Appl. No.: 102,419

[22] Filed: Dec. 11, 1979

[30] Foreign Application Priority Data

Dec. 18, 1978 [CH] Switzerland ........................ 12832/78

[51] Int. Cl.[3] ................................................ G06K 5/00

[52] U.S. Cl. ........................................ 250/556; 356/71

[58] Field of Search ............... 250/555, 556, 566, 567; 340/146.3 H, 146.3 Q, 146.3 S, 146.3 MA; 356/71, 394; 209/534

[56] References Cited

U.S. PATENT DOCUMENTS 3,275,985 9/1966 Dunn et al. .................. 340/146.3 S 4,184,081 1/1980 Bergamini ........................... 250/556

*Primary Examiner*—David C. Nelms

*Assistant Examiner*—Edward P. Westin

*Attorney, Agent, or Firm*—Burns, Doane, Swecker & Mathis

[57] ABSTRACT

Specimens, the quality of whose print is to be examined, are scanned photoelectrically point-by-point and compared point-by-point with one or more originals. The resulting reflectance differences are processed in different correction stages and then subjected to a point-by-point threshold decision, an individual threshold value being used for each image point. The threshold values are produced by analysis of specimens which have acceptable deviations, the maximum positive and negative reflectance differences due to their deviations being used directly as the threshold values. The analysis is effected by reference to electronically simulated specimens, an original or originals and a specimen being electronically displaced relatively to one another and reflectances being electronically varied in order to simulate register deviations and shade or tone deviations.

12 Claims, 1 Drawing Figure

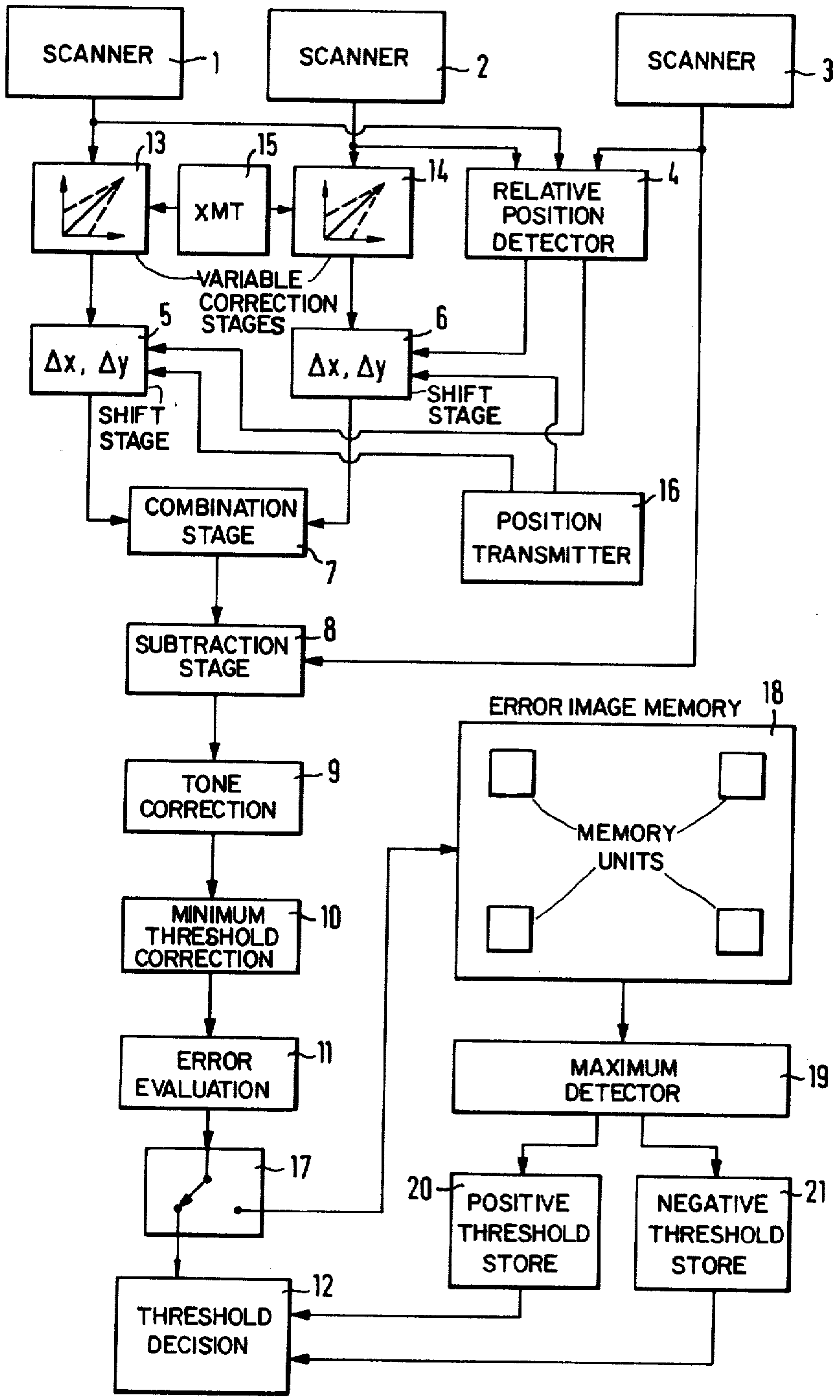
SCANNER
1
SCANNER
2
SCANNER
3
13
15
XMT
14
RELATIVE POSITION DETECTOR
4
VARIABLE CORRECTION STAGES
Δx, Δy
5
Δx, Δy
6
SHIFT STAGE
SHIFT STAGE
COMBINATION STAGE
7
POSITION TRANSMITTER
16
SUBTRACTION STAGE
8
ERROR IMAGE MEMORY
18
MEMORY UNITS
TONE CORRECTION
9
MINIMUM THRESHOLD CORRECTION
10
ERROR EVALUATION
11
MAXIMUM DETECTOR
19
17
20
POSITIVE THRESHOLD STORE
NEGATIVE THRESHOLD STORE
21
THRESHOLD DECISION
12

PROCESS FOR ASSESSING THE QUALITY OF A PRINTED PRODUCT

FIELD OF THE INVENTION

This invention relates to a process for assessing the quality of a printed product by point-by-point comparison of a specimen under test and an original, in which values are formed representing the differences between the reflectances of the individual image points of the specimen produced by point-by-point photoelectric scanning and the reflectances of the image points of the original corresponding to the image points of the specimen, and in which the resultant difference values are processed and evaluated in accordance with specific criteria, evaluation including a final threshold value decision.

PRIOR ART

A process of this kind is described, for example, in U.S. Pat. No. 4,139,779 from which it will be seen that one of the difficulties in an automatic assessment process is to distinguish acceptable faults or errors from unacceptable faults or errors in order to avoid incorrect assessment of the specimen. For example, according to the aforementioned U.S. Patent relatively small differences in the reflectances of the specimen and the original are eliminated by means of a minimum threshold correction, so that these small errors are not included in subsequent evaluation. The determination of this minimum threshold is a critical factor. For example, in banknotes there are zones in which even the smallest colour deviations are perceived by the eye as being errors, while on the other hand there are zones, e.g. in the case of the watermark, in which even relatively considerable deviations are considered as acceptable without any difficulty. In this connection, the aforementioned U.S. Patent states that the minimum threshold need not be the same over the entire image area, but may have a higher value locally, e.g. in the area of a watermark. Although this procedure gives very good results, i.e. the frequency of incorrect assessments is relatively low, it has been found that these steps are not yet adequate in every case.

OBJECT OF THE INVENTION

The object of the invention, accordingly, is to improve a process of the aforementioned type so that it will operate more reliably and result in fewer incorrect assessments of the specimens.

Another object of the invention is to reduce the cost of the process, for identical quality requirements.

Yet another object of the invention is to achieve the above objectives with the minimum expenditure.

SUMMARY OF THE INVENTION

In accordance with this invention therefore we provide a process for assessing the quality of a printed product by point-by-point comparison of a specimen under test and an original, comprising forming values representing the differences between the reflectances of individual image points of the specimen produced by point-by-point photoelectric scanning and the reflectances of image points of the original corresponding to the image points of the specimen, processing the resultant difference values in accordance with specific criteria, and evaluating said values by making a final threshold value decision utilizing an individual positive threshold value and/or an individual negative threshold value for each individual image point, said threshold values being produced by error analysis for each image point of reference printed products having the maximum acceptable errors.

The reference printed products used are preferably those which have the maximum, but still acceptable, deviations. The errors should be of different kinds (positional errors, register errors, shade or tone errors) in order that the effects of every possible fault or error occurring in practice can be covered by a machine test.

A preferred embodiment of the invention will be explained in detail hereinafter with reference to one exemplified embodiment of apparatus suitable for performing a method in accordance with the invention, as shown diagrammatically in the accompanying drawing.

DETAILED DESCRIPTION OF PREFERRED EMBODIMENT

Except for a number of additional stages which will be explained hereinafter, the apparatus illustrated is identical to the apparatus described in U.S. Pat. Nos. 4,131,879; 4,139,779 and 4,143,279. It comprises three photoelectric scanners 1–3 for the point-by-point photoelectric scanning of the reflectances of a specimen and two sub-originals 1, 2, a relative position detector stage for determining the relative positions between the specimen and the individual sub-originals, two shift stages 5 and 6 controlled by the stage 4 to take into account and compensate for deviations in relative positions, a combination stage 7 for electronically combining the image contents of the two sub-originals, a subtraction stage 8 in which the differences are formed between the reflectances of corresponding points of the image of the specimen and the combined originals, a tone correction stage 9, a minimum threshold correction stage 10, an error evaluating stage 11 operating by the error crest method as described in U.S. Pat. No. 4,139,779, and a threshold decision stage 12 which generates a "good" or "poor" signal depending on the result of a point-by-point threshold decision.

To that extent the apparatus illustrated coincides with the apparatus described in the aforementioned patents. In addition, the apparatus illustrated comprises two variable correction stages 13 and 14 with a transmitter stage 15 for adjusting the required correction curve, a position transmitter stage 16, by means of which the shift stages 5 and 6 can be driven in the same way as via the relative position detector stage 4, but independently thereof, and electronic switch 17, an error image store 18, which comprises a plurality of sub-stores (only four of which are schematically illustrated in the Figure), a maximum detection stage 19 and two threshold stores 20 and 21 for the positive and negative thresholds, on the basis of which the threshold decision stage 12 gives its good or poor decision.

The three separate scanner 1–3 could be replaced by a single scanner and two suitable stores, the individual sub-originals being scanned sequentially and the resulting scanned values being written into the corresponding store accordingly. The same applies to the shift stages 5 and 6, only one of which would be required for sequential operation. These and other possible variations of the apparatus are within the knowledge of those versed in the art and therefore require no further explanation. All the electronic parts of the apparatus other than that concerned with purely analog areas, is advantageously embodied, not in hardware, but by a suitably programmed electronic computer.

Where the printed products are produced by just a single printing process, e.g. just by recess or offset printing, or if the products are printed by a plurality of processes but the quality requirements are less stringent, only a single original containing the entire image is required. In that case, the apparatus would be reduced by the corresponding number of scanners or stores and the combination stage.

Very high-quality printed products, e.g. banknotes and other security-printed papers, are usually produced in a number of passes using different printing techniques (recess printing, letterpress, or offset). In that case, more accurate examination is rendered possible by the use—as proposed in U.S. Pat. No. 4,143,279 previously referred to—of a plurality of sub-originals, the image content of each of which corresponds to the printed product image content produced by each one of the different printing techniques.

One of the main requirements for this type of examination is that the relative positions of the specimen and the originals should be known with respect to some fixed coordinate system (usually the specimen scanning raster). The reason for this is that in practice it is practically impossible to position the originals and the specimens in the scanner so that the scanned points really do coincide with the respective image points on the specimen and original or originals.

In the position determining system 4 described in greater detail in U.S. Pat. No. 4,131,879 previously referred to, in accordance with the two originals, two pairs of relative coordinates $\Delta x$, $\Delta y$ are determined for each image point between the specimen and the two originals.

In the shift stages 5 and 6, the directly determined or stored scanned values of the two originals are then shifted, by the amount corresponding to their associated coordinates $\Delta x$, $\Delta y$, by computation, so that all the image points of the two originals coincide with those of the specimen. The above-mentioned U.S. Pat. No. 4,143,279 describes in greater detail how this is effected. The correction stages 13 and 14 are inactive during normal examination of the printed products, i.e. they do not influence the reflectances.

The shifted or position-corrected reflectances of the two sub-originals are then combined in the combination stage 7, simply by multiplication to give an overall original, which in stage 8 is compared point-by-point with the specimen. The reflectance differences $\Delta I_i$ produced by the comparison stage 8 in these conditions form a picture of the difference between the specimen and the combined original. These reflectance differences $\Delta I_i$ are then subjected to tone correction in stage 9, a mean value being formed from the differences of a certain surrounding zone of each image point and being subtracted from the difference of the image point. Faulty assessments due to relatively small shade deviations of the specimen are avoided by this shade or tone correction.

The tone-corrected difference values are then fed to the minimum threshold correction stage 10, in which all those tone-corrected difference values which do not exceed a predetermined minimum threshold are eliminated, so that they are no longer included in the further assessment. U.S. Pat. No. 4,139,779 previously referred to, gives full details of the tone and minimum threshold correction and also describes in detail the following error crest evaluation stage 11. An important feature of the error crest method is that the difference values of the individual image points are not considered individually in isolation, but always in conjunction with the difference values of the surrounding points, the latter each being given a distance-dependent weighting.

The difference values processed in this way finally give the decision "good" or "poor" in stage 12 by threshold detection. The threshold values required for this purpose—a positive value and a negative value per image point—are contained in the threshold stores 20 and 21. Their location or formation is described in the following.

The method according to the invention is based on the fact the even "good" specimens—i.e., those which are considered good on visual examination—do not coincide exactly with the original or originals, but always result in certain reflectance differences $\Delta I$ on comparison in stage 8. The magnitude of these reflectance differences, their sign, and their distribution over the entire image area, naturally depend on what is and what is not considered as permissible on visual examination. It has been found by experience that most image errors are due to register errors between the individual prints, positional errors of the watermarks and fluctuations in colour tone or shade. Other error sources are image distortion and positioning errors between the specimen and the original or originals. The deviations permissible for each type of error are pre-determined. According to the invention, the effects that all these permissible errors have on the reflectance differences at each individual image point are examined and the threshold values governing the error decision are so selected that specimens whose deviations from the original are still within what is permissible, are evaluated as "good". This adjustment of the threshold values is of course very critical, because the boundary between "good"—i.e., specimens having just acceptable errors, and "poor" specimens is very difficult to draw, because the effects of the different types of error on the reflectance differences are very different. For example it may be that a register error which is of itself acceptable produces a greater reflectance difference than an unacceptable error in respect of the watermark position.

According to the method described herein, specimens having various errors, but with the errors still at the boundary of what is acceptable, are analyzed and the maximum positive and maximum negative reflectance difference resulting from all these errors are determined for each image point. For this purpose, an "error image" made up of the individual difference values at each image point is produced for each specimen and is stored on a point-by-point basis for each image in a separate sub-store of the error image store 18 by way of the appropriately set switch 17. The maximum value selector 19 then seeks the maximum positive and maximum negative difference value for each image point from the individual sub-stores and stores them on a point-by-point basis for each image in the two threshold stores 20 and 21. These stored maximum difference values are thus used directly as individual threshold values for the good/poor decision in stage 12. (If required, the maximum difference values can be increased by a certain safety factor by an additive constant).

For practical performance of this error analysis or threshold determination, a large number of specimens would first have to be visually inspected and then examined on the apparatus. According to a further important aspect of the method, the error analysis is greatly simplified by the fact that it is not the actual specimens that are examined, but instead such specimens are electronically simulated and the simulated specimens are examined. In these conditions the maximum acceptable errors can be conveniently adjusted and just a few simulated specimens are sufficient to cover practically all possible cases.

The simulation of register errors and positional deviations is effected by means of the position transmitter stage 16 and the shift stages 5 and 6 controlled by stage 16. To this end, either a substantially perfect printed product or one with average register errors, etc., is used as a specimen and the relative positions are determined with respect to the original or originals by means of the relative position determination stage 4. The original or originals are then successively shifted in the four directions of the scanning raster by an amount equal to the maximum acceptable distance in each case and the shifted original or originals is/are compared with the specimen which, in this case, really has the function of the original. To repeat the point, the shifting of the originals is, of course, not effected physically but comprises associating the reflectances with image points shifted by an amount equal to one or more image point distances, or a distance-dependent interpolation or extrapolation of the reflectances at the individual image points. The reflectance differences produced from these successive image comparisons together giving an image of the errors of the associated simulated specimens are then stored in the error image store 18 and processed further as described.

Of course the simulation of faulty specimens can be carried out completely without actual examination by forming an ideal specimen electronically from the originals themselves, storing this specimen, and then using it as a standard of comparison.

The simulation of register deviations between the individual prints of the product is effected by relative displacement of the two originals and simulation of positional errors is effected by simultaneous displacement with respect to the real or synthetic comparison specimen. Of course, a combination of both shifts is possible.

The simulation of positional errors of the watermark is best effected by means of two originals, one of which contains no watermark and the other of which contains only the watermark.

The two correction stages 13 and 14 and the variation transmitter stage 15 controlling them are provided for simulation of tone or shade errors due to the printing inks or colour of the paper. These correction stages convert their input, i.e. the measured reflectances $I_m$, to resultant reflectances $I_R$, e.g. in accordance with the linear equation:

$$I_R = \frac{I_w \pm a}{I_w} \cdot (I_m \pm a)$$

where $I_w$ denotes the reflectance for a reference white. The conversion or correction of the reflectances may be effected both for the neutral reflectance (total brightness) and for one or more colour reflectances. Accordingly, in one case it simulates positive or negative neutral density deviations and in the other case corresponding colour deviations from the comparison standard.

Of course a complete quality test may be carried out in either single-channel form (black-white) or in multichannel form (e.g. the three primary colours).

The factor a in the above conversion formula is adjustable by way of the variation transmitter stage 15. On subsequent examination of the actual test objects, the factor a is of course zero, so that the reflectances pass through the correction stages unchanged.

The above-described method of producing the decision threshold values is of course also applicable to printed products of the kind requiring only a single original for their examination, in which case it is even simpler because the number of possible errors is reduced.

For less stringent requirements, there is no need for a positive threshold value and a negative threshold value for each point of the image, instead either just the positive or just the negative threshold values are determined and then stored in a single threshold store. The error decision is then taken by reference to an absolute residual threshold comparison.

In addition to, or instead of, the electronic simulation of certain printing faults, a mechanical or optical simulation can be applied by physical shifting or turning the specimen and original or originals or by introducing filters etc. into the path of the scanning beams.

With the above-described method, the definitive error decision is not taken until the reflectance differences have undergone a relatively long processing in stages 9, 10 and 11. However, with the principle according to the invention, i.e. individual evaluation threshold for each individual image point, the error decision can be taken at an earlier stage, e.g. after the tone correction stage 9 or directly after the comparison stage 8, in which case the subsequent stages would of course be superfluous. In that case, of course, the error images of the simulated specimens would also have to be produced at the corresponding locations, i.e. after the tone correction or directly after the difference formation, and the threshold values be formed again therefrom. These simpler variants of the test process are of course somewhat less sensitive and accurate but in cases in which the quality requirements are not so stringent they do allow a considerable reduction of the computing costs.

If the error decision is taken directly in the difference area after the comparison stage, in which case a specimen is assessed as poor or defective if the reflectance difference at an image point or at a predetermined number of image points exceeds or falls below a positive or negative threshold value which, if required, may be increased by the safety factor, then the reflectances are advantageously subjected to low-pass filtering during scanning in order to avoid pronounced error peaks and give a more rounded curve for the difference values over the image area. Suitable methods of low-pass filtration are explained in great detail in the aforementioned U.S. Pat. No. 4,143,279.

The principle of the invention, i.e. individual decision thresholds for each individual image point, allows previous test methods to be refined while it permits considerable reduction of costs in the case of reduced quality requirements. In such cases, for example, it is no longer necessary to compensate fully for position and register errors in the quality control. Instead it is sufficient for the errors occurring in the case of simpler and hence less accurate register deviation compensation to be cancelled by raising the error threshold at the critical image points.

The quality control process according to the invention has another advantage: The individual error thresholds can be very easily up-dated. For example, if a new production batch arrives, a number of "good" specimens can be examined from this batch and their error images with respect to the originals can be formed. If these error images contain greater errors than the previous error images, the relevant threshold values are replaced by the difference values in the relevant points of the new error images.

As already stated, apart from stages 13 to 21, all the stages of the apparatus are described in full detail in U.S. Pat. Nos. 4,131,879; 4,139,779 and 4,143,279, and the contents of which are hereby incorporated by reference. These publications also explain general photoelectric scanning problems in the machine quality control of printed products and suitable methods and apparatus for the purpose. These publications are as stated above, expressly part of this specification, so that no further explanation of the apparatus according to the invention is necessary to those versed in the art.

I claim:

1. A process for assessing the quality of a printed product by point-by-point comparison of a specimen under test and an original, comprising the steps of forming values representing the differences between the reflectances of individual image points of the specimen produced by point-by-point photoelectric scanning and the reflectances of image points of the original corresponding to the image points of the specimen, processing the resultant difference values in accordance with specific criteria, and evaluating said values by making a final threshold value decision utilizing at least one of an individual positive threshold value and an individual negative threshold value for each individual image point, said threshold values being produced by error analysis for each image point of reference printed products having the maximum acceptable errors.

2. A process according to claim 1, wherein the threshold values utilized for each image point are in each case the maximum positive and the maximum negative deviation between the associated reference image points and the original image points occurring on examination of the reference printed produts immediately before the threshold decision.

3. A process according to claim 2, including the steps of using reference printed products having electronically simulated deviations which are close as possible to the boundary of what is visually acceptable, for said error analysis.

4. A process according to claim 3, including electronically simulating displacement between the specimen and the original to provide positional and register errors.

5. A process according to claim 3, including the step of simulating shade or tone errors by correction of the reflectances in at least one colour channel.

6. A process according to claim 2, wherein the threshold values used are respectively the maximum positive and maximum negative deviations increased by a constant amount.

7. A process according to claim 2, including storing deviations from a standard printed product image-wise for each simulated reference printed product, the maximum positive and the maximum negative value being stored as threshold values for the associated image point and located in each case for each image point from all the stored values.

8. A process according to claim 1, including making a threshold decision directly by reference to the reflectance differences formed by the point-by-point comparison of the original and the specimen.

9. A process according to claim 8, including low-pass filtering the reflectances obtained from the photoelectric scanning.

10. A process according to claim 1, including the step of algebraically adding the reflectance difference values of the image points surrounding each image point with a distance-dependant weighting to the reflectance difference value associated with each image point, and making a threshold decision by reference to these added values.

11. A process according to claim 5, including storing deviations from a standard printed product image-wise for each simulated reference printed product, the maximum positive and the maximum negative value being stored as threshold values for the associated image point and selected in each case for each image point from all the stored values.

12. A process according to claim 7, including the step of algebraically adding the reflectance difference values of the image points surrounding each image point with a distance-dependent weighting to the reflectance difference value associated with each image point, and making a threshold decision by reference to these added values.

* * * * *